United States Patent [19]

Dixon

[11] 4,195,142

[45] Mar. 25, 1980

[54] MODIFIED TERTIARY AMIDE POLYMERS

[75] Inventor: Kenneth W. Dixon, Sewickley, Pa.

[73] Assignee: GAF Corporation, New York, N.Y.

[21] Appl. No.: 809,942

[22] Filed: Jun. 24, 1977

[51] Int. Cl.$^2$ .................. C08F 8/18; C08F 8/20
[52] U.S. Cl. .................. 525/340; 525/354; 525/359; 525/419
[58] Field of Search .................. 526/41, 27, 46

[56] References Cited

U.S. PATENT DOCUMENTS

| 2,212,786 | 8/1967 | McQueen | 526/41 |
| 3,314,909 | 4/1967 | Whitfield et al. | 526/41 |
| 4,139,688 | 2/1979 | Dixon | 526/41 |

FOREIGN PATENT DOCUMENTS

| 1115021 | 4/1959 | Fed. Rep. of Germany | 526/41 |
| 1397743 | 6/1963 | United Kingdom | 526/41 |
| 448190 | 10/1974 | U.S.S.R. | 526/27 |

*Primary Examiner*—William F. Hamrock
*Attorney, Agent, or Firm*—Walter C. Kehm; J. J. Ward; Sheldon Parker

[57] ABSTRACT

Polymers having a tertiary amide group, particularly homopolymers and copolymers of vinylpyrrolidone, are modified by treatment with reactive acid chlorides, the amide functions being converted into amide chlorides. These modified polymers are reactive intermediates and may be used to obtain a variety of new polymeric substances.

7 Claims, No Drawings

MODIFIED TERTIARY AMIDE POLYMERS

BACKGROUND OF THE INVENTION

This invention relates to the preparation of modified polymers containing tertiary amide units, in which the amide function is converted to a reactive amide chloride.

The reaction of tertiary amides with reactive acid chloride to obtain amide chlorides, and some of the products which can be prepared from the amide chlorides are described in articles by Eilingsfeld et al in *Angew. Chem.* 72, 836 (1960), and *Chemische Ber.* 96, 2671 (1963). The modification of polymeric substances containing tertiary amide groups has not been described.

Polymers containing tertiary amide groups are extremely unreactive at the tertiary amide site. By the use of this invention, these unreactive polymers can be converted into modified polymers which, as reactive intermediates, can be readily converted into various new polymeric substances.

SUMMARY OF THE INVENTION

Modified tertiary amide polymers containing units having the partial structure:

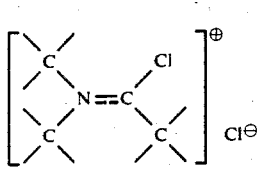

are prepared by reacting a polymer or copolymer having tertiary amide groups with a reactive acid chloride.

DETAILED DISCLOSURE

Tertiary amide polymers which can be modified to yield the amide chloride derivatives of this invention are polymers and copolymers having tertiary amide groups and which do not have other functional groups capable of hindering the reaction with the acid chloride or themselves reacting with the acid chloride. Of particular interest as the polymeric substance to be modified is polyvinylpyrrolidone or copolymers containing vinylpyrrolidone and one or more other monomers copolymerizable therewith. The invention, however, is fully applicable to other tertiary amide polymers and copolymers including polyoxazolines, poly(N,N-dialkylacrylamides), poly(N-vinyllactams) and N-alkyl nylons.

The reactive acid chlorides which can be employed include thionyl chloride, phosgene, phosphorus trichloride, phosphorus pentachloride, oxalyl chloride, and the like. Preferred are thionyl chloride and phosgene.

The reaction medium is preferably a solvent for the acid chloride but need not be so. It may also be a solvent for the polymer, but, again, need not be so. The solvent should be a substance in which the amide chloride-modified polymer is insoluble; this provides for ease in recovery. The essential requirement for the solvent is that it be unreactive with the polymer, the acid chloride and the modified polymer. Within these limitations, virtually any solvent maybe used. Suitable solvents include hydrocarbons (aliphatic and aromatic), chlorinated hydrocarbons, ketones and ethers which have boiling points higher than the reactive temperatures used. Examples of suitable solvents are n-heptane, toluene, chloroform and diethyl ether.

The reaction temperature employed should be sufficiently high to promote a desirable reaction rate, but not so high as to promote undesirable side actions. Suitable temperatures will vary greatly depending upon the polymer reactant, the acid chloride chosen and the reaction medium.

Preferred reactive temperatures are from about 0° C. to about 70° C.

The ratio of the reactant polymer and acid chloride varies widely depending primarily on how many of the amide groups are desired to be modified to amide chloride groups. The amount of acid chloride to be used is in stoichiometric proportion to the percentage of amide groups to be modified. If it is desired to modify all the amide groups, an excess of acid chloride may be employed with no detrimental effect, though this would not be economically attractive.

The modified polymers of this invention contain reactive sites which could be used in the preparation of new polymeric substances such as, for example, polycationic polyvinylpyrrolidone cosmetics, various new insoluble polymeric reagents, modified polymers for reprographics, etc.

This invention will be better understood by reference to the following examples, which are included here for the purposes of illustration only and are not to be regarded as limitations.

EXAMPLE 1

To a 500 ml. flask equipped with mechanical stirrer, thermometer, reflux condenser, and addition funnel were added 200 ml. of anhydrous chloroform and 33.3 g. of polyvinylpyrrolidone (K-90 available from GAF Corporation). The mixture was stirred until all of the polymer had dissolved, then cooled to 15° C. From the addition funnel was added 35.7 g. of thionyl chloride over 1 hour. As the addition proceeded, the product precipitated as an off-white, amorphous mass. The mixture was allowed to stir at ambient temperature for two hours. The product was then filtered off and washed with chloroform, then dried under vacuum to yield 40.6 g. of an off-white powder. Analysis of the solid, showed 21.73% chlorine and 0.07% sulfur.

EXAMPLE 2

To a 250 ml. flask equipped as in Example 1 was added 100 ml. of dry heptane and 30 g. of a 60/40 mole-ratio copolymer of vinylpyrrolidone and vinyl acetate (S-630 available from GAF Corporation). The suspension was cooled to 15° C. and 21.2 g. of thionyl chloride was added over 40 minutes. Stirring was continued for 3 hours and the product filtered off and washed with chloroform. After drying in vacuo, 38.4 g. of a tan powder was recovered. The solid analyzed for 19.15% chlorine, 5.85% nitrogen and 0.07% sulfur.

EXAMPLE 3

To a 250 ml. flask equipped as in Example 1 were added 30.0 g. of poly(N,N-dimethylacrylamide) and 100 ml. of dry heptane. After cooling to 15° C., 23.2 g. of thionyl chloride was added over 40 minutes. After 3 hours at ambient temperature, the product was filtered off and washed with heptane. The dried product analyzed for 15.1% chlorine.

EXAMPLE 4

To a 250 ml. flask equipped as in Example 1 were added 30.0 g. of poly(2-ethyl-2-oxazoline) and 100 ml. of dry heptane. After cooling to 15° C., 23.3 g. of thionyl chloride was added over 40 minutes. After 3 hours at ambient temperature, the product was filtered off and washed with heptane. The dried product analyzed for 12.3% chlorine.

EXAMPLE 5

To a suspension of 30.0 g. of polyvinylpyrrolidone amide chloride from Example 1 in 150 ml. of chloroform was added 13.5 g. of diethylamine over 1 hour at 10°–15° C. Evaporation of the solvent left a residue, which was dissolved in absolute ethanol. The solution of the cationic resin was useful in hair sprays.

EXAMPLE 6

This example shows the utility of polymeric amide chlorides for converting organic acids into the corresponding acid chlorides. A slurry of 50.0 g. of the amide chloride of poly(N,N-dimethylacrylamide) prepared in Example 3 in 50.0 g. of trichloroacetic acid was heated at 80°–85° C. for 3 hours. The polymer was filtered off and recycled for conversion back to the amide chloride. The filtrate was found to contain trichloroacetyl chloride.

EXAMPLE 7

To a slurry of 50.0 g. of the amide chloride of poly(N,N-dimethylacrylamide) prepared in Example 3 in 125 ml. of absolute ether, a solution of 23.0 g. of 2,4-dihydroxybenzophenone in 100 ml. of absolute ether was added at 0° C. The mixture was stirred at 25° C. for 3 hours. The ether was decanted, and the residue washed well with 100 ml. of a 15% aqueous solution of sodium acetate. The resulting polymer was useful as an ultraviolet light absorber in sun screening formulations.

EXAMPLE 8

To a solution of 196 g. of poly(piperazine adipamide) in 600 ml. of chloroform at 15° C., was added 120 g. of thionyl chloride over 1 hour. After an additional 3 hours at ambient temperature, the product was filtered off and washed with chloroform. The dried product analyzed for 11.6% chlorine.

I claim:

1. A process for the preparation of a polymer or copolymer having tertiary amide chloride units comprising reacting at about 0°–70° C. a polymer or copolymer having tertiary amide groups with an acid chloride selected from the group consisting of thionyl chloride, phosgene, phosphorus trichloride, phosphorus pentachloride and oxalyl chloride, said polymer or copolymer having tertiary amide groups geing devoid of other groups reactive with said acid chloride or capable of hindering the desired reaction between said tertiary amide groups and said acid chloride.

2. A process according to claim 1 in which the acid chloride is thionyl chloride.

3. A process according to claim 1 in which the polymer having tertiary amide groups is polyvinylpyrrolidone or a copolymer thereof.

4. The product of the process of claim 1.

5. The product of the process of claim 2.

6. A process according to claim 1 wherein said units have the structure

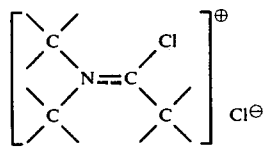

7. The product of the process of claim 3.